(12) United States Patent
Paik et al.

(10) Patent No.: US 12,632,732 B2
(45) Date of Patent: May 19, 2026

(54) METHOD AND APPARATUS FOR MULTI-LABEL CLASS CLASSIFICATION BASED ON COARSE-TO-FINE CONVOLUTIONAL NEURAL NETWORK

(71) Applicant: CHUNG ANG UNIVERSITY INDUSTRY ACADEMIC COOPERATION FOUNDATION, Seoul (KR)

(72) Inventors: Joon Ki Paik, Seoul (KR); Jin Ho Park, Suwon-si (KR); Hee Gwang Kim, Seoul (KR); Min Woo Shin, Daejeon (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/659,042

(22) Filed: May 9, 2024

(65) Prior Publication Data

US 2024/0296329 A1 Sep. 5, 2024

Related U.S. Application Data

(63) Continuation of application No. PCT/KR2021/017922, filed on Nov. 30, 2021.

(30) Foreign Application Priority Data

Nov. 4, 2021 (KR) ........................ 10-2021-0150366

(51) Int. Cl.
*G06N 3/08* (2023.01)

(52) U.S. Cl.
CPC ..................................... *G06N 3/08* (2013.01)

(58) Field of Classification Search
CPC ........... G06F 18/00; G06N 3/045; G06N 3/08
See application file for complete search history.

(56) References Cited

U.S. PATENT DOCUMENTS

2016/0117587 A1* 4/2016 Yan ........................... G06N 3/04
706/20
2016/0260014 A1 9/2016 Hagawa et al.
(Continued)

FOREIGN PATENT DOCUMENTS

| JP | 2020-113055 A | 7/2020 |
| KR | 10-2018-0062423 A | 6/2018 |
| KR | 10-2021-0027910 A | 3/2021 |

OTHER PUBLICATIONS

Jiao et al., "Weakly labeled fine-grained classification with hierarchy relationship of fine and coarse labels", Jul. 16, 2019, J. Vis. Commun. Image R. 63 (2019) 102584, pp. 1-11. (Year: 2019).*

(Continued)

*Primary Examiner* — Brent Johnston Hoover

(57) ABSTRACT

An apparatus for multi-label class classification based on a coarse-to-fine convolutional neural network includes: a processor; and a memory connected to the processor, in which the memory stores program instructions executed by the processor to generate a plurality of hierarchical structure based group labels for a plurality of classes to be classified by using a disjoint grouping method, predict classes which belong to the plurality of group labels, respectively among the plurality of classes by using a coarse-to-fine convolutional neural network including a main network and one or more subnetworks, complete learning of the coarse-to-fine convolutional network through the prediction, and classify one or more classes included in the image by receiving a feature map input from a last convolutional layer of the one (Continued)

or more subnetworks by the main network of the coarse-to-fine convolutional neural network of which learning is completed.

7 Claims, 5 Drawing Sheets

(56) References Cited

U.S. PATENT DOCUMENTS

2016/0307072 A1* 10/2016 Zhou ................... G06V 10/426
2019/0102658 A1* 4/2019 Wang ....................... G06N 3/08

OTHER PUBLICATIONS

Park et al., "CF-CNN: Coarse-to-Fine Convolutional Neural Network", Apr. 20, 2021, Appl. Sci. 2021, 11, 3722, pp. 1-14. (Year: 2021).*
International Search Report of PCT/KR2021/017922 dated Aug. 1, 2022.
Written Opinion of the International Searching Authority of PCT/KR2021/017922 dated Aug. 1, 2022.

* cited by examiner

FIG. 5

| CIFAR-100 | | |
|---|---|---|
| Network Model | Number of Labels | Accuracy |
| HD-CNN | 9, 100 | 65.64 |
| B-CNN | 8, 20, 100 | 64.42 |
| VGG-16 | 100 | 63.04 |
| WideResnet-16 (k = 8) | 100 | 75.74 |
| SplitNet | 100 | 76.04 |
| ResNet-164 | 100 | 74.84 |
| ResNet-326 | 100 | 75.05 |
| Pre-ResNet-326 | 100 | 78.02 |
| Pre-ResNet-1001 | 100 | 80.36 |
| WideResnet-28 (k = 10) | 100 | 80.75 |
| WideResnet-28 (k = 12) | 100 | 81.48 |
| PyramidNet-110 (α = 200) | 100 | 81.98 |
| PyramidNet-272 (α = 200) | 100 | 84.36 |
| CF-VGG-16 | 5, 25, 100 | 65.11 |
| CF-ResNet-164 | 5, 25, 100 | 77.01 |
| CF-ResNet-326 | 5, 25, 100 | 76.85 |
| CF-Pre-ResNet-326 | 5, 25, 100 | 80.77 |
| CF-Pre-ResNet-1001 | 5, 25, 100 | 82.09 |
| CF-WideResnet-28 (k = 10) | 5, 25, 100 | 82.38 |
| CF-WideResnet-28 (k = 12) | 5, 25, 100 | 82.67 |
| CF-PyramidNet-110 (α = 200) | 5, 25, 100 | 82.57 |
| CF-PyramidNet-272 (α = 200) | 5, 25, 100 | 84.94 |

METHOD AND APPARATUS FOR MULTI-LABEL CLASS CLASSIFICATION BASED ON COARSE-TO-FINE CONVOLUTIONAL NEURAL NETWORK

CROSS-REFERENCE TO RELATED APPLICATION

This application is a continuation of pending PCT International Application No. PCT/KR2021/017922, which was filed on Nov. 30, 2021, and which claims priority to Korean Patent Application No. 10-2021-0150366 which was filed in the Korean Intellectual Property Office on Nov. 4, 2021. The disclosures of which are hereby incorporated by reference in their entireties.

TECHNICAL FIELD

The present invention relates to a method and an apparatus for multi-label class classification based on a coarse-to-fine convolutional neural network.

BACKGROUND ART

Most deep neural networks use a Convolution Neural Network (CNN) model to extract various features from an input image.

In recent years, CNN-based deep learning studies tend to expand a network to solve nonlinear problems, and in general, CNN-based methods expand a depth of a layer and the number of filters in each layer.

However, as the number of parameters in the network increases, it is difficult to optimize the parameter, and to solve this problem, a hierarchical deep CNN algorithm has been proposed, which groups the related class into a plurality of categories and then classifies the class using sub-CNN corresponding to each category.

This method can classify a relatively small number of classes included in each category to improve the entire network performance.

However, the conventional method has a problem in that the number of subnetworks required is proportional to the number of categories, requiring prelearning of each subnetwork, and the accuracy is greatly affected by class grouping.

DISCLOSURE

Technical Problem

In order to solve the problem of the related art, the present invention is to propose a method and an apparatus for multi-label class classification based on a coarse-to-fine convolutional neural network, which increase the accuracy of multiple-class classification and is easy to optimize a parameter.

Technical Solution

In order to achieve the object, according to an embodiment of the present invention, provided is an apparatus for multi-label class classification based on a coarse-to-fine convolutional neural network, which includes: a processor; and a memory connected to the processor, in which the memory stores program instructions executed by the processor to generate a plurality of hierarchical structure based group labels for a plurality of classes to be classified by using a disjoint grouping method, predict classes which belong to the plurality of group labels, respectively among the plurality of classes by using a coarse-to-fine convolutional neural network including a main network and one or more subnetworks, complete learning of the coarse-to-fine convolutional neural network through the prediction, and classify one or more classes included in the image by receiving a feature map input from a last convolutional layer of the one or more subnetworks by the main network of the coarse-to-fine convolutional neural network of which learning is completed.

The plurality of group labels may include a fine label and one or more coarse labels, the fine label may include the plurality of classes in one group, and the one or more coarse labels may have different group numbers according to a higher level and a lower level.

The higher-level coarse label may have a smaller group number than the lower-level coarse label.

The plurality of hierarchical structure based group labels may be generated through class scores calculated through CNNs pretrained for the plurality of respective classes.

Each of a plurality of groups included in a coarse label at a single level may include classes which are not duplicated with each other among the plurality of classes through group assignment vector orthogonal properties.

The plurality of classes may be prevented from being unequally included in one of the plurality of groups included in the coarse label at the single level through group balance normalization.

The main network may include a refine convolutional layer, and the refine convolutional layer may receive a feature map input in a last convolutional layer of the one or more subnetworks to classify one or more classes.

A first coarse label and a second coarse label of the different levels may be included, and the one or more subnetworks may include a first subnetwork that predicts a class included in the first coarse label and a second subnetwork that predicts a class included in the second coarse label.

According to another aspect of the present invention, provided is a method for multi-label class classification based on a coarse-to-fine convolutional neural network in an apparatus including a processor and a memory, which includes: generating a plurality of hierarchical structure based group labels for a plurality of classes to be classified by using a disjoint grouping method; predicting classes which belong to the plurality of group labels, respectively among the plurality of classes by using a coarse-to-fine convolutional neural network including a main network and one or more subnetworks; completing learning of the coarse-to-fine convolutional neural network through the prediction; and classifying one or more classes included in the image by receiving a feature map input from a last convolutional layer of the one or more subnetworks by the main network of the coarse-to-fine convolutional neural network of which learning is completed.

According to yet another aspect of the present invention, provided is a computer-readable recording medium storing a program for executing the method.

Advantageous Effects

According to the present invention, there is an advantage in that a plurality of classes are grouped through a disjoint grouping method to increase the accuracy of classification, and it is possible to classify the class even without prelearning of a subnetwork.

DESCRIPTION OF DRAWINGS

FIG. 5 illustrates a performance of a coarse-to-fine convolutional neural network according to the embodiment.

BEST MODE

Figure 1:
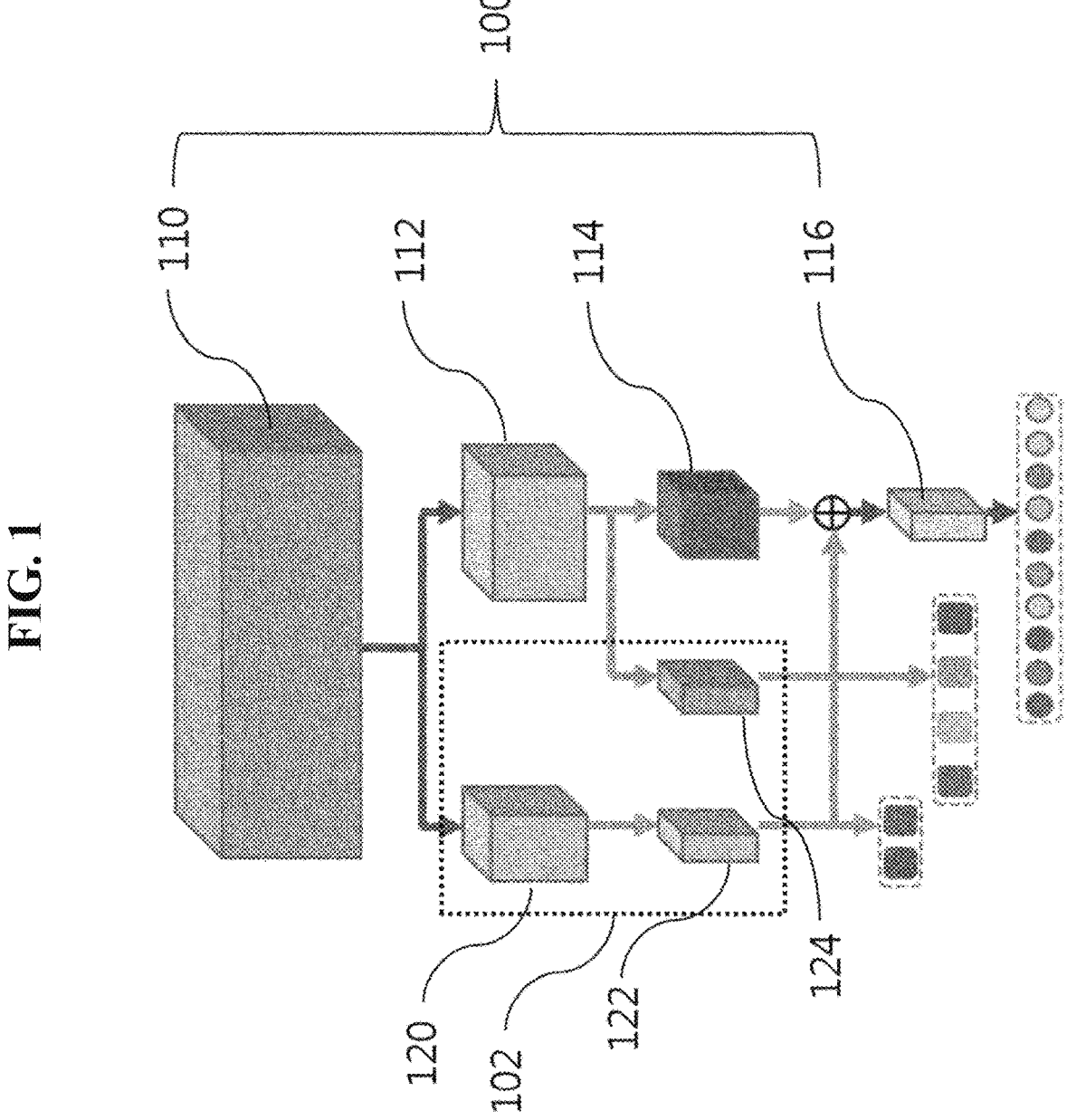
FIG. 1 is a diagram showing a configuration of a CF-CNN according to an embodiment of the present invention.

The present invention may apply various modifications and have various embodiments, and specific embodiments will be illustrated in the drawings and described in detail.

However, this does not limit the present invention to specific embodiments, and it should be understood that the present invention covers all the modifications, equivalents and replacements included within the idea and technical scope of the present invention.

According to a preferred embodiment of the present invention, provided is a hierarchical learning method called a Coarse-to-Fine Convolutional Neural Network (hereinafter referred to as CF-CNN).

Figure 2:
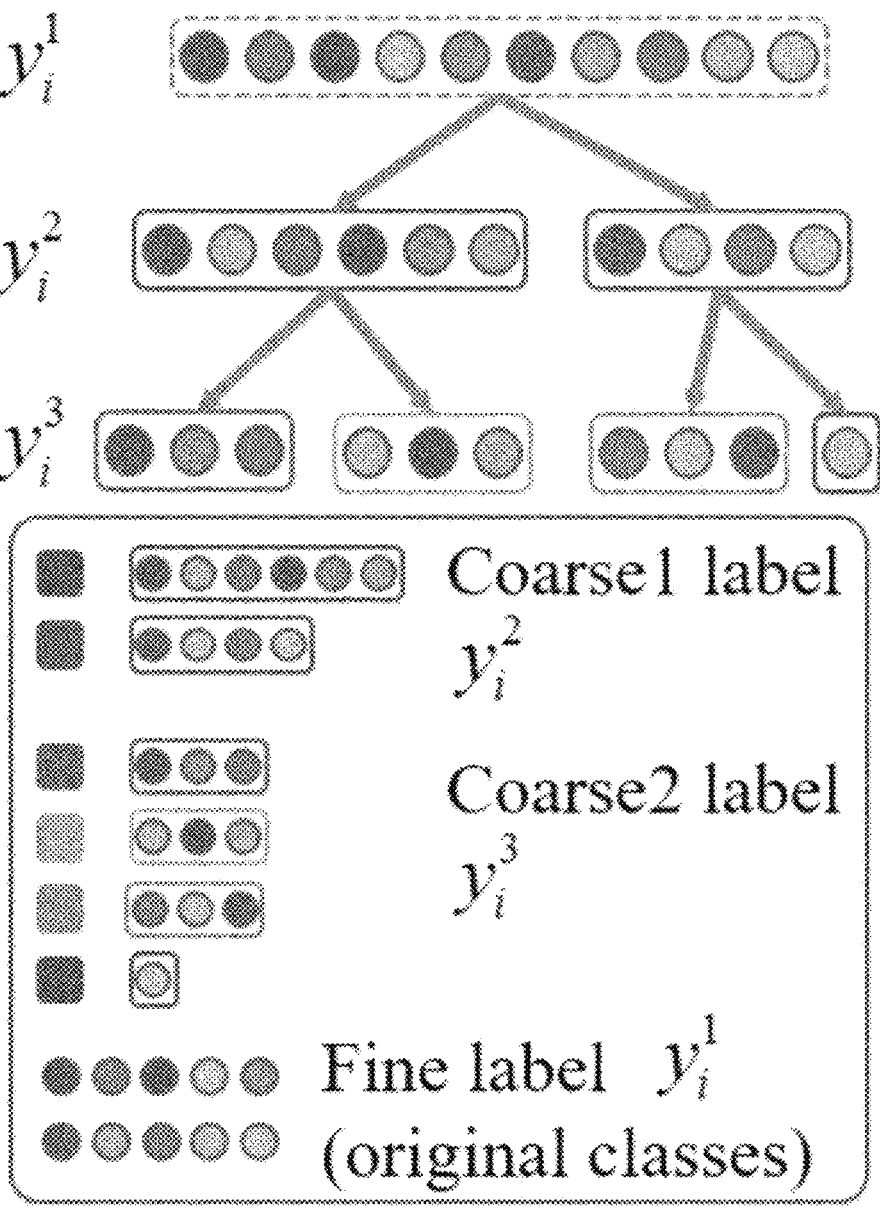
FIG. 2 is a diagram showing a plurality of hierarchical structure based group labels.

FIG. 1 is a diagram illustrating a configuration of a CF-CNN according to an embodiment of the present invention, and FIG. 2 is a diagram illustrating a plurality of hierarchical structure based group labels.

The CF-CNN according to the embodiment includes a main network 100 for fine classification of a multi-label class included in an image, and a subnetwork 102 for coarse prediction, and performs class classification based on a hierarchical structure.

The main network 100 according to the embodiment is a network for the fine classification of the multi-label class, and may include a plurality of main convolutional layers 110 to 114 extracting a feature of an input image, and a refine convolutional layer 116 for feature map fusion.

According to the embodiment, there may be one or more subnetworks 102, and in FIG. 1, it is shown as an example that two subnetworks are applied.

Referring to FIG. 1, a first sub network includes a first sub convolutional layer 120 and a second sub convolutional layer 122 that sequentially generate feature maps by using an output of a first main convolutional layer 110 of the main network 100 as an input.

A second subnetwork includes a third sub convolutional layer 124 that generates a feature map by using an output of a second main convolutional layer 112 as an input.

The class classification according to the embodiment first generates a plurality of hierarchical structure based group labels by using a disjoint grouping method for a plurality of classes to be classified, predicts a class which belongs to each of the plurality of group labels among the plurality of classes by using a coarse-fine convolutional neural network including a main network and one or more subnetworks, completes learning the coarse-to-fine convolutional neural network through the prediction, and when an image including objects corresponding to one or more classes is input, classifies one or more classes included in the image by receiving a feature map input from a last convolutional layer of the one or more subnetworks by the main network of the coarse-to-fine convolutional neural network of which learning is completed.

The multi-label class classification according to the embodiment may be performed by an apparatus including a processor and a memory.

Here, the processor may include a central processing unit (CPU) capable of executing a computer program or other virtual machines.

The memory may include a non-volatile storage device such as a fixed hard drive or a removable storage device. The removable storage device may include a compact flash unit, a USB memory stick, etc. The memory may also include a volatile memory such as various random access memories.

In the memory according to the embodiment, program instructions for the group label generation, the class prediction, the network learning, the multi-label class classification in the input image, etc. are stored.

For the hierarchical structure based class classification, the subnetwork is added and learning of classifying the class corresponding to the hierarchical structure based group label may be performed to enhance classification performance and reduce a calculation load, but classification accuracy may not be guaranteed.

To this end, the refine convolutional layer 116 is provided to the main network 100 according to the embodiment, and the refine convolutional layer 116 receives a last feature map of each subnetwork 102 and a last feature map of the main network 100 to classify the multi-label class.

According to the embodiment, the feature map generated by the subnetwork 102 serves as a guide so that the main network 100 may perform more detailed classification.

Further, since the subnetwork 102 has a lower depth than the main network 100, a gradient loss problem may be alleviated in a learning process.

In the embodiment, a plurality of hierarchical structure based group labels for a plurality of classes having a similar class score is generated by using each class score predicted in a basic CNN model (e.g., ResNet).

As shown in FIG. 2, here, the plurality of group labels may include a fine label and one or more coarse labels, and the fine label may include a plurality of classes as one group, which is the same as an original class, and one or more coarse labels have different group numbers according to a higher level and a lower level.

Thereafter, each class group label is used as a classification label of each subnetwork, and the coarse label and the fine label of each network are simultaneously learned.

FIG. 2 illustrates Coarse1 label and Coarse2 label which are hierarchical structure based group labels for 10 classes, and the fine label.

Referring back to FIG. 1, when a group label is generated based on a hierarchical structure for a plurality of classes, group labels in respective labels are simultaneously learned by using the main network 100 and one or more subnetworks 102.

All feature maps of the last convolutional layers 122 and 124 of the subnetwork 102 are used for fine class prediction through the refine convolutional layer 116.

According to a preferred embodiment of the present invention, the disjoint grouping method is used in order to increase the classification accuracy of the multi-label class.

$x_i \in \mathbb{R}^d$ represents an input data instance (class), $y_i \in \{1, \ldots, C\}$ represents the class label, and C represents a total class number.

M training samples $$D = \{x_i, y_i\}_{i=1}^M$$

and a corresponding class score $$S = \{x_i, s_i\}_{i=1}^M$$

obtained in a pretrained deep CNN are given, a target of the disjoint grouping method is described below.

For coarse classification in the subnetwork, a hierarchical multi-level group label $$Q^l = \{x_i, y_i^l\}_{i=1}^M$$

is obtained.

A class score vector represented as $s_i \in \mathbb{R}^C$ is obtained by applying a softmax function to a deep CNN result. Here, C may be regarded as a dimension of a class score.

$$y_i^l \in \{1, \dots, G^l\}$$

and $G^l$ represent a group label and the number of groups of an l-th level, respectively.

$$y_i^1$$

which is a label of a first level is the same as an original class label $y$. In order to train the CF-CNN, the loss function is defined as follows.

$$\min_W \sum_{l=1}^L \mathcal{L}(W, x, y^l), \qquad \text{[Equation 1]}$$

Here, $\mathcal{L}(W, x, y^l)$ represents a cross entropy loss of a hierarchically structuralized group label in each level $l \in \{1, \dots, L\}$ of training data, L represents the total number of a layer level, and W represents a weight parameter of the network.

In order to obtain the hierarchical structure based group label, the same disjoint grouping normalization is used.

The hierarchical structure based group label is generated by using the normalization jointly with a class score of a pretrained CNN. Each class has a group label of a hierarchical structure by the normalization, and a class included in a group label of the lower level has the same classification boundary as a group label of the higher level.

When the number of groups represented by K is given, and the class which belongs to the high-level group label $\mathcal{G}$ is i, $$p_{ki}^g$$

represents whether class i is assigned to group k, $k = 1, \dots, K$.

A disjoint grouping assignment vector of dimension K, which is represented by $$p_{ki}^g$$

represents whether the class of the higher level group label $\mathcal{G}$ is assigned to group k.

Since the target of the disjoint grouping method creates the hierarchical group label without duplication between the classes, it is assumed that there is no duplicated part between groups which belong to respective group labels, and consequently, $$\sum_{k=1}^K p_k^g = 1^K.$$

Here, when represents a $1^K$ vector of 1, and $s^g$ is a class score which belongs to group label g, the proposed disjoint grouping method minimizes a combination of three objective functions as follows.

$$\min_p \mathcal{G}_D(s^g, p_k^g) + \lambda_O \mathcal{G}_O(p_k^g) + \lambda_B \mathcal{G}_B(p_k^g), \qquad \text{[Equation 2]}$$

wherein, $\lambda_O$ and $\lambda_B$ represent normalization parameters.

In order to apply a gradient descent optimization method, a binary variable $$p_k^g$$

is changed to a real variable of a range [0, 1] under a constraint condition $$\sum_{k=1}^K p_k^g = 1^K \cdot p_{ki}^g$$

is parameterized into $z_{ki}$ which is a non-limitation variable by using the softmax function.

$$p_{ki}^g = \frac{e^{z_{ki}}}{\sum_{k=1}^K e^{z_{ki}}}. \qquad \text{[Equation 3]}$$

An objective function for generating a group label which satisfies a disjoint attribute is as follows.

$$\mathcal{G}_D(s_{mean}^g, p_k^g) = \sum_{k<j} \left( \sum_{i=1}^{C^g} s_{i,mean}^g p_{ki}^g \cdot \sum_{i=1}^{C^g} s_{i,mean}^g p_{ji}^g \right), \qquad \text{[Equation 4]}$$

wherein, $i \in \{1, \ldots, C^g\}$ represents a class which belongs to the higher level group label g, $C^g$ represents the total class number of the group g, and $$s_{i,mean}^g$$

represents a mean class score vector of class i obtained as below. As described above, in the embodiment, the classes are grouped so as to satisfy the disjoint attribute by using the class score.

When it is assumed that there is no duplication of the class between the groups of the group label for each level, group assignment vectors should be orthogonal.

That is, $$p_k^g \cdot p_j^g = 0, \forall i \neq j.$$

The group assignment vector obtained in Equation 4 also illustrates orthogonal properties, but a normalization term is added to get a better result.

$$\mathcal{G}_O(p_k^g) = \sum_{k<j} p_k^g \cdot p_j^g. \qquad \text{[Equation 5]}$$

The group assignment vectors obtained in Equations 4 and 5 may assign most classes to one group. In extreme cases, all classes may be assigned to one group. To avoid such a problem, the following normalization term that controls the balance between groups is added.

$$\mathcal{G}_B(p_k^g) = \sum_{k=1}^{K} \left( \sum_{i=1}^{C^g} p_{ki} \right)^2. \qquad \text{[Equation 6]}$$

Figure 3:
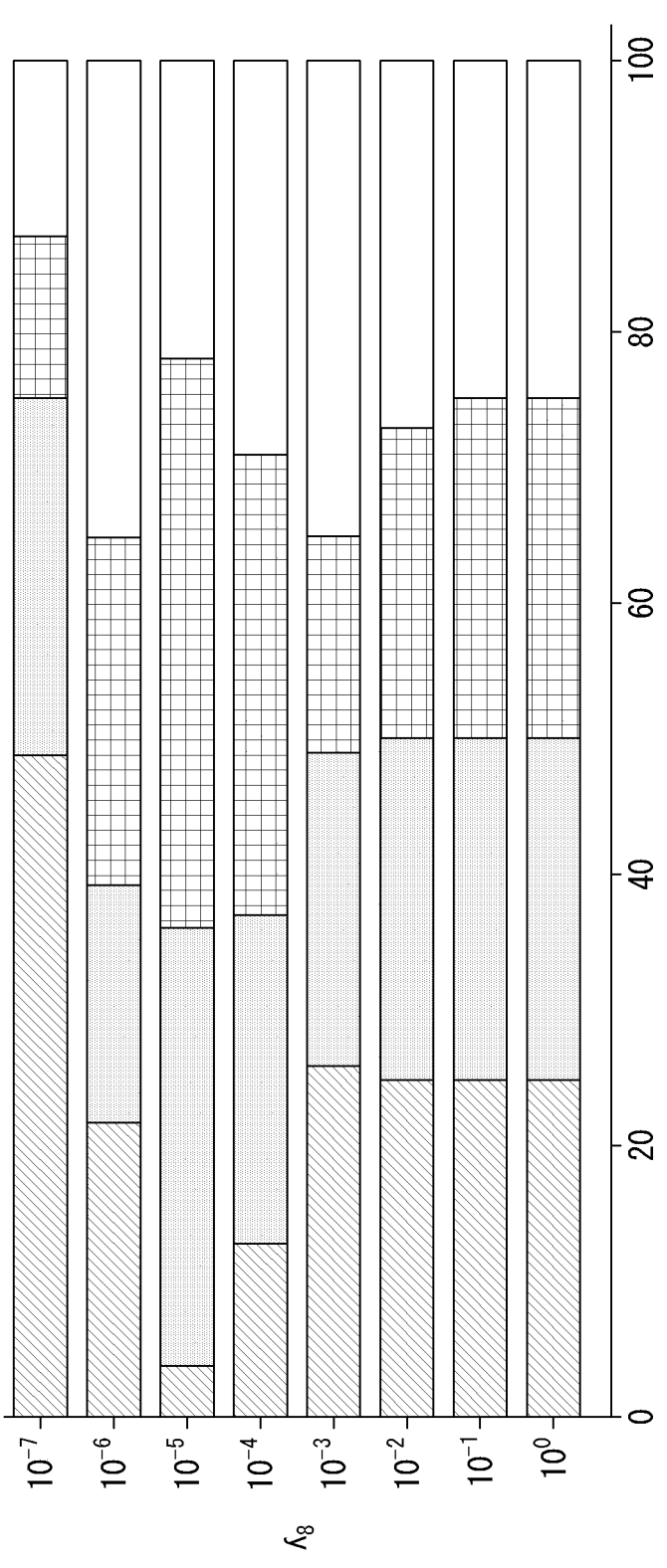
FIG. 3 illustrates an effect of group balance normalization in a disjoint grouping method according to the embodiment.

FIG. 3 illustrates an effect of group balance normalization in a disjoint grouping method according to the embodiment.

In FIG. 3, each color bar represents group K, and a width of the bar represents a ratio of classes which belong to each group K. When $\lambda_B$ is large, the ratio of the corresponding group is similar. On the contrary, when $\lambda_B$ is small, the group ratio may be flexible. However, when $\lambda_B$ is very small, almost all classes belong to one group.

Figure 4:
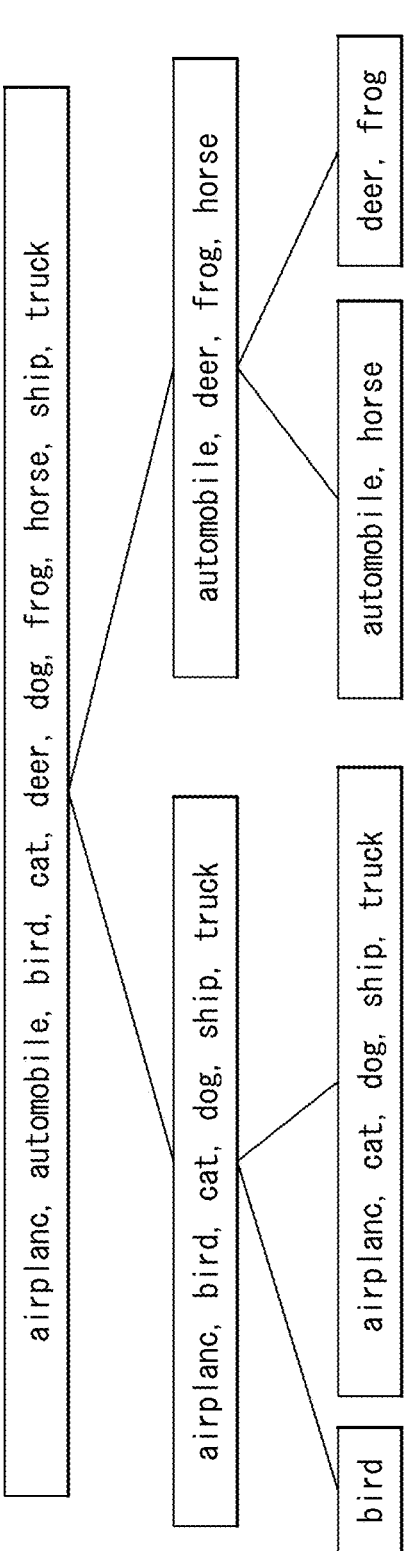
FIG. 4 illustrates a result of generating a hierarchical structure based group label by using a CIFAR-10 dataset having 10 classes.

FIG. 4 illustrates a result of generating a hierarchical structure based group label by using a CIFAR-10 dataset having 10 classes.

In order to obtain the class score, a prelearned ResNet model is used, and $\lambda_O$ and $\lambda_B$ are set to 1 and 105, respectively.

The group label of each level in each subnetwork is used to predict the coarse label, and a feature map of a last convolutional layer of each subnetwork is combined with the feature map of the convolutional layer of the main network. The combined feature map is fused through a refine convolutional layer 116, and used for fine prediction.

FIG. 5 illustrates a performance of a coarse-to-fine convolutional neural network according to the embodiment.

As shown in FIG. 5, it can be seen that as compared with a scheme (Number of labels: 100) of classifying the class without grouping, when the coarse-to-fine convolutional neural network is applied by setting the number of groups to 5 and 25, the classification accuracy is improved.

The embodiment of the present invention is disclosed for the purpose of exemplification and it will be apparent to those skilled in the art that various modifications, additions, and substitutions are possible within the spirit and scope of the present invention and the modifications, changes, and additions should be considered as falling within the scope of the following claims.

What is claimed is:

1. An apparatus for multi-label class classification based on a coarse-to-fine convolutional neural network, the apparatus comprising:

a processor; and a memory connected to the processor, wherein the memory stores program instructions to train a coarse-to-fine convolutional neural network and to classify one or more classes in an input image using a trained coarse-to-fine convolutional neural network, the instructions executed by the processor to generate a plurality of hierarchical structure based group labels for a plurality of classes to be classified by using a disjoint grouping method, predict classes which belong to the plurality of group labels, respectively among the plurality of classes, by using the coarse-to-fine convolutional neural network including a main network and one or more subnetworks, complete learning of the coarse-to-fine convolutional network through the prediction to produce the trained coarse-to-fine convolutional neural network, and classify one or more classes included in the input image by receiving a feature map input from a last convolutional layer of the one or more subnetworks by the main network of the trained coarse-to-fine convolutional neural network;

wherein the main network comprises a refine convolutional layer configured to fuse a last feature map from each of the one or more subnetworks with a last feature map of the main network to generate a fused feature map for fine classification;

wherein the plurality of hierarchical structure based group labels are generated through class scores calculated using a basic convolutional neural network model pretrained for the plurality of respective classes;

wherein to generate the plurality of hierarchical structure based group labels comprises computing softmax-parameterized group assignment vectors satisfying orthogonality constraints and a group-balance normalization term based on the class scores;

wherein the plurality of classes are prevented from being unequally included in one of the plurality of groups included in a coarse label at a single level through group balance normalization; and wherein the one or more subnetworks of the coarse-to-fine convolutional neural network are not pretrained.

2. The apparatus for multi-label class classification of claim 1, wherein the plurality of group labels includes a fine label and one or more coarse labels, the fine label includes the plurality of classes in one group, and the one or more coarse labels have different group numbers according to a higher level and a lower level.

3. The apparatus for multi-label class classification of claim 2, wherein a higher-level coarse label has a smaller group number than a lower-level coarse label.

4. The apparatus for multi-label class classification of claim 2, wherein each of a plurality of groups included in a coarse label at a single level includes classes which are not duplicated with each other among the plurality of classes through group assignment vector orthogonal properties.

5. The apparatus for multi-label class classification of claim 1, wherein the main network includes a refine convolutional layer, and the refine convolutional layer receives a feature map input in a last convolutional layer of the one or more subnetworks to classify one or more classes.

6. The apparatus for multi-label class classification of claim 2, wherein the one or more coarse labels include a first coarse label and a second coarse label of different levels, and the one or more subnetworks include a first subnetwork that predicts a class included in the first coarse label and a second subnetwork that predicts a class included in the second coarse label.

7. A method for multi-label class classification in an apparatus including a processor and a memory, the method comprising:

training a coarse-to-fine convolutional neural network by generating a plurality of hierarchical structure based group labels for a plurality of classes to be classified by using a disjoint grouping method;

predicting classes which belong to the plurality of group labels, respectively among the plurality of classes by using a main network and one or more subnetworks of the coarse-to-fine convolutional neural network; and completing learning of the coarse-to-fine convolutional network through the prediction to produce a trained coarse-to-fine convolutional neural network; and classifying one or more classes in an input image using the trained coarse-to-fine convolutional neural network by receiving a feature map input from a last convolutional layer of the one or more subnetworks by the main network of the trained coarse-to-fine convolutional neural network, wherein the main network comprises a refine convolutional layer configured to fuse a last feature map from each of the one or more subnetworks with a last feature map of the main network to generate a fused feature map for fine classification;

wherein the plurality of hierarchical structure based group labels are generated through class scores calculated using a basic convolutional neural network model pretrained for the plurality of respective classes;

wherein generating the plurality of hierarchical structure based group labels comprises computing softmax-parameterized group assignment vectors satisfying orthogonality constraints and a group-balance normalization term based on the class scores;

wherein the plurality of classes are prevented from being unequally included in one of the plurality of groups included in a coarse label at a single level through group balance normalization; and wherein the one or more subnetworks of the coarse-to-fine convolutional neural network are not pretrained.

\* \* \* \* \*